United States Patent
Chen et al.

(10) Patent No.: US 9,332,565 B2
(45) Date of Patent: May 3, 2016

(54) TRANSMISSION GAP CREATION AND COMMUNICATIONS APPARATUS UTILIZING THE SAME

(71) Applicant: MediaTek Inc., Hsin-Chu (TW)

(72) Inventors: Yu-Cheng Chen, Jhubei (TW); Ming-Fong Jhang, Zhubei (TW); Kuan-Jen Peng, Taipei (TW); Yu-Ting Yao, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 15 days.

(21) Appl. No.: 14/243,062

(22) Filed: Apr. 2, 2014

(65) Prior Publication Data
US 2014/0302864 A1    Oct. 9, 2014

Related U.S. Application Data

(60) Provisional application No. 61/810,027, filed on Apr. 9, 2013.

(51) Int. Cl.
*H04B 1/00* (2006.01)
*H04W 72/12* (2009.01)
*H04L 5/00* (2006.01)

(52) U.S. Cl.
CPC ................... *H04W 72/1215* (2013.01)

(58) Field of Classification Search
CPC ................................. H04W 72/1215
USPC ....................................... 455/452.1
See application file for complete search history.

(56) References Cited

U.S. PATENT DOCUMENTS

| 8,254,365 | B2 | 8/2012 | Storm et al. |
| 2006/0171358 | A1* | 8/2006 | Kangas et al. ................ 370/331 |
| 2008/0309490 | A1* | 12/2008 | Honkanen et al. ......... 340/572.1 |
| 2009/0067448 | A1* | 3/2009 | Stanwood et al. ............ 370/447 |
| 2011/0296064 | A1 | 12/2011 | Ehsan et al. |
| 2013/0201884 | A1* | 8/2013 | Freda et al. ................... 370/278 |
| 2013/0285867 | A1* | 10/2013 | Wang et al. ................... 343/770 |
| 2013/0322413 | A1* | 12/2013 | Pelletier et al. ............... 370/336 |
| 2015/0334703 | A1* | 11/2015 | Xu .................... H04W 72/0446 370/253 |

FOREIGN PATENT DOCUMENTS

| CN | 1960550 | 5/2007 |
| CN | 201733290 | 2/2011 |
| WO | 2010105669 | 9/2010 |

* cited by examiner

*Primary Examiner* — Kamran Afshar
*Assistant Examiner* — Ather Mohiuddin
(74) *Attorney, Agent, or Firm* — McClure, Qualey & Rodack, LLP

(57) ABSTRACT

A communications apparatus includes a first radio frequency (RF) signal processing device, a first baseband signal processing device and a processor. The first RF signal processing device transceives a plurality of RF signals to and from a peer communications apparatus to communicate with the peer communications apparatus in compliance with a first Radio Access Technology (RAT) and processing the RF signals. The first baseband signal processing device processes a plurality of baseband signals corresponding to the RF signals. The processor obtains an uplink scheduling indicating a predetermined time assigned by the peer communications apparatus to transmit uplink data from the baseband signals, determines whether to transmit the uplink data at the predetermined time according to a gap-creation criterion, and transmits padding instead of the uplink data to the peer communications apparatus at the predetermined time when the gap-creation criterion is satisfied.

15 Claims, 5 Drawing Sheets

TRANSMISSION GAP CREATION AND COMMUNICATIONS APPARATUS UTILIZING THE SAME

CROSS REFERENCE TO RELATED APPLICATIONS

This application claims the benefit of U.S. Provisional Application No. 61/810,027 filed 2013 Apr. 9 and entitled "Transmission Gap Creation for Interference Resolution". The entire contents of which are hereby incorporated by reference.

BACKGROUND OF THE INVENTION

1. Field of the Invention

The invention relates to methods for transmission gap creation without causing uplink performance degradation and communications apparatus utilizing the same.

2. Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard and can be used for home networks, mobile phones, and video games, to provide a high-frequency wireless local area network. The LTE (Long Term Evolution) and the LTE-Advanced evolved from the LTE is a 4G mobile communications system, which provides a high-speed data transmission over the 2G and 3G system.

BRIEF SUMMARY OF THE INVENTION

Communications apparatuses are provided. An exemplary embodiment of a communications apparatus comprises a first radio frequency (RF) signal processing device, a first baseband signal processing device and a processor. The first RF signal processing device transceives a plurality of RF signals to and from a peer communications apparatus to communicate with the peer communications apparatus in compliance with a first Radio Access Technology (RAT) and processing the RF signals. The first baseband signal processing device processes a plurality of baseband signals corresponding to the RF signals. The processor obtains an uplink scheduling indicating a predetermined time assigned by the peer communications apparatus to transmit uplink data from the baseband signals, determines whether to transmit the uplink data at the predetermined time according to a gap-creation criterion, and transmits padding instead of the uplink data to the peer communications apparatus at the predetermined time when the gap-creation criterion is satisfied.

An exemplary embodiment of a communications apparatus comprises a first radio module, a second radio module and a coordinator. The first radio module communicates with a first peer communications apparatus to provide wireless communications services in compliance with a first RAT. The second radio module communicates with a second peer communications apparatus to provide wireless communications services in compliance with a second RAT. The coordinator is coupled to the first radio module and the second radio module, directs the first radio module to transmit padding instead of uplink data to the first peer communications apparatus at a predetermined time when the second radio module has a radio activity to be performed. The predetermined time is assigned by the first peer communications apparatus for the first radio module to transmit the uplink data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
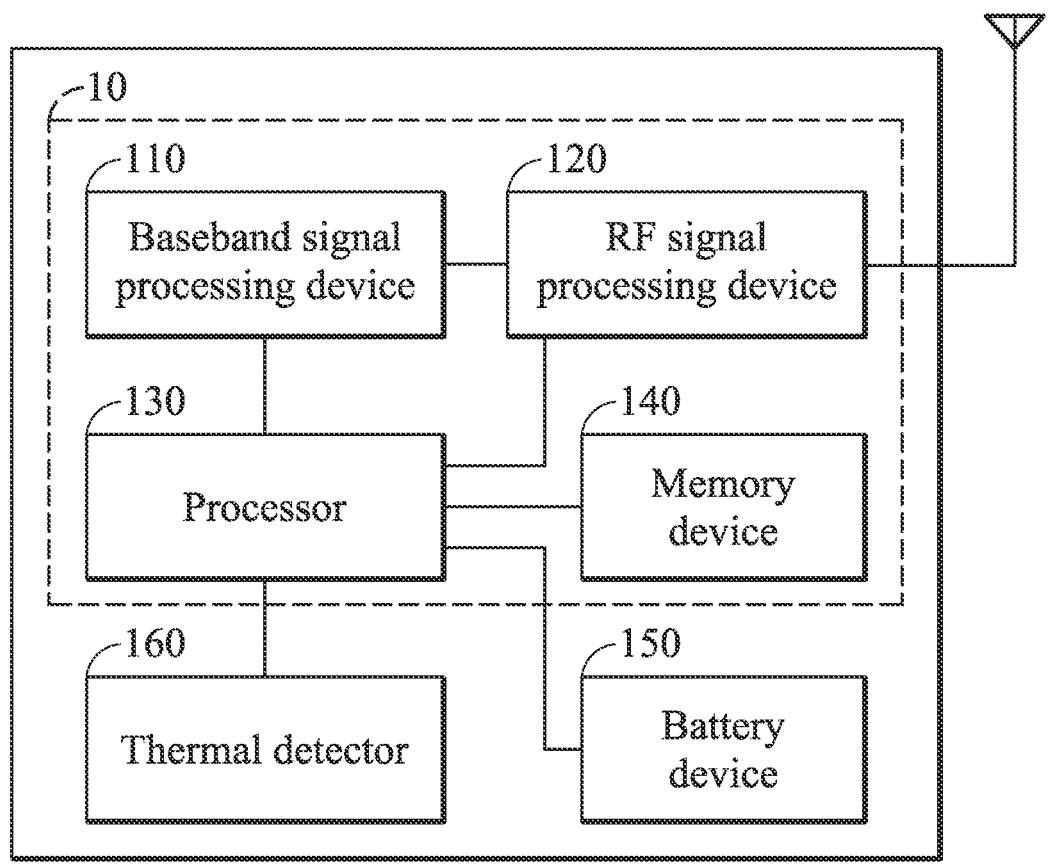
FIG. 1 is a block diagram of a communications apparatus according to an embodiment of the invention.

FIG. 1 shows a block diagram of a communications apparatus according to an embodiment of the invention. The communications apparatus 100 may be a notebook, a cellular phone, a portable gaming device, a portable multimedia player, a Global Positioning System (GPS), a receiver, a personal digital assistant, a tablet computer, or another such device. The communications apparatus 100 may comprise at least a baseband signal processing device 110, a radio frequency (RF) signal processing device 120, a processor 130, a memory device 140, a battery device 150, a thermal detector 160, and an antenna module comprising at least one antenna.

Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The peer communications apparatus may be, for example but is not limited to, a base station, an eNode B, an access point, or other such devices in the wireless network. The RF signal processing device 120 may comprise a plurality of hardware elements to perform radio frequency conversion. For example, the RF signal processing device 120 may comprise a power amplifier, a mixer, or others.

The baseband signal processing device 110 may process (for example, decode and demodulate) the baseband signals corresponding to the RF signals processed by the RF signal processing device 120 to obtain information or data transmitted by the peer communications apparatus, such as the system information carried by the peer communications apparatus in the RF signals, and may process (for example, encode and modulate) uplink data to be transmitted to the peer communications apparatus as the baseband signals and provide the baseband signals to the RF signal processing device 120. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The battery device 150 may provide power storage and supply power for the communications apparatus 100. The thermal detector 160 may detect the thermal condition of the communications apparatus 100. The battery device 150 and thermal detector 160 may provide information regarding the remaining battery charge and the current thermal condition to the processor 130.

The processor 130 may control the operations of the baseband signal processing device 110, the RF signal processing device 120, the memory device 140, the battery device 150 and the thermal detector 160. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the communications apparatus 100.

According to an embodiment of the invention, the baseband signal processing device 110, the RF signal processing device 120, the processor 130 and the memory device 140 may be collectively regarded as a radio module 10 capable of communicating with the peer communications apparatus in a wireless network to provide wireless communications services in compliance with a predetermined Radio Access Technology (RAT). Note that, in some embodiments of the invention, the communications apparatus 100 may further be extended to comprise more than one antenna and/or more than one radio module, and the invention should not be limited to what is shown in FIG. 1.

Figure 2:
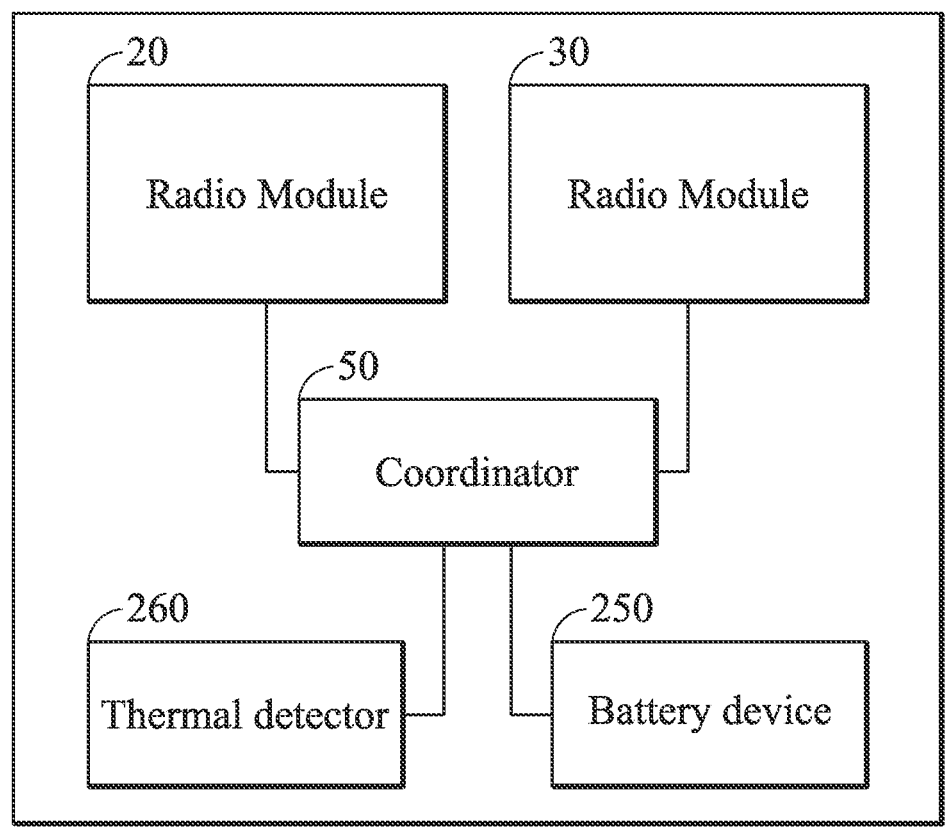
FIG. 2 is a block diagram of a communications apparatus according to another embodiment of the invention.

FIG. 2 shows a block diagram of a communications apparatus according to another embodiment of the invention. The communications apparatus 200 may be a notebook, a cellular phone, a portable gaming device, a portable multimedia player, a Global Positioning System (GPS), a receiver, a personal digital assistant, a tablet computer, or another such device. The communications apparatus 200 may comprise at least two radio modules 20 and 30, a coordinator 50, a battery device 250 and a thermal detector 260. Note that, in order to clarify the concept of the invention, FIG. 2 presents a simplified block diagram in which only the elements relevant to the invention are shown. However, the invention should not be limited to what is shown in FIG. 2.

The radio module 20 is capable of communicating with a first peer communications apparatus in a first wireless network to provide wireless communications services in compliance with a first RAT. The radio module 30 is capable of communicating with a second peer communications apparatus in a second wireless network to provide wireless communications services in compliance with a second RAT. The radio modules 20 and 30 may respectively comprise a baseband signal processing device, an RF signal processing device, a processor and a memory device as the radio module 10 shown in FIG. 1. Therefore, descriptions of the components comprised in the radio modules 20 and 30 may refer to the descriptions of FIG. 1, and are omitted here for brevity.

The radio modules 20 and 30 may be equipped with an individual antenna module, or may share the same antenna module, and the invention should not be limited thereto. The coordinator 50 may coordinate performance of the radio activities of the radio modules 20 and 30, so as to avoid coexistence interference and/or arbitrate the right of using the shared radio resource. When the radio modules 20 and 30 are both equipped with an individual antenna module, the coexistence interference may be the cross-talk interference when the radio modules 20 and 30 perform transmitting or receiving radio activities at the same time. The cross-talk interference may occur especially when the radio modules 20 and 30 perform transmitting or receiving radio activities at the same time in the same or adjacent frequency bands. When the radio modules 20 and 30 share the same antenna module, the coordinator 50 may arbitrate the right of using the shared antenna module.

The battery device 250 may provide power storage and supply power for the communications apparatus 200. The thermal detector 260 may detect the thermal condition of the communications apparatus 200. The battery device 250 and thermal detector 260 may provide information regarding the remaining battery charge and the current thermal condition to the coordinator 50.

Note that, in some embodiments of the invention, the coordinator 50 may also be configured inside and integrated into the processor of either radio module. Thus the coordinator 50 may also be regarded as a processor comprised in a radio module as discussed above, and the invention should not be limited to the architecture as shown in FIG. 2.

According to an embodiment of the invention, the radio modules 10, 20 and/or 30 may actively create a transmission gap without causing uplink performance degradation when required. The transmission gap may be required when determining that, for example but not limited to, power consumption of the communications apparatus 100/200 should be reduced, a temperature the communications apparatus 100/200 is too high, coexistence interference is about to occur, or others. According to an embodiment of the invention, the coordinator 50 or the processor in the radio module 10, 20 or 30 may determine that a transmission gap is required when one or more gap-creation criterion is/are satisfied. The gap-creation criterion may be, for example, whether the temperature of the communications apparatus 100/200 exceeds an upper threshold, whether the remaining battery charge of the communications apparatus 100/200 is lower than a lower threshold, and whether another radio module has a radio activity to be performed (when there is more than one radio module equipped in the communications apparatus).

Conventionally, when a communications apparatus simply terminates the current uplink transmission without getting the permission from peer communications apparatus in the network side, the peer communications apparatus may consider that the uplink radio resources are wasted, and may further punish the communications apparatus for wasting uplink radio resources. The punishment may include decreasing the data rate, or even dropping the connection.

However, in the embodiments of the invention, the radio modules 10, 20 and/or 30 may actively create a transmission gap without the peer communications apparatus determining that the uplink radio resources are being wasted. Therefore, the uplink performance will not be degraded as it is with conventional designs. The proposed methods for transmission gap creation without causing uplink performance degradation and communications apparatus utilizing the same are further discussed in the following paragraphs.

According to an embodiment of the invention, when a radio module has some uplink data to be transmitted to the peer communications apparatus in the network side, the radio module may transmit a scheduling request to the peer communications apparatus, or perform a random access procedure, so as to request for uplink radio resources. The radio module may further transmit information regarding the data size of the uplink data to be transmitted to the peer communications apparatus. For example, the radio module may transmit a Buffer Status Report (BSR) to the peer communications apparatus. Upon receiving information regarding the data size of the uplink data to be transmitted by the communications apparatus, the peer communications apparatus in the network side may assign uplink radio resources for the communications apparatus to transmit the uplink data, and transmit information regarding the assigned uplink radio resources to the communications apparatus. For example, the peer communications apparatus may transmit uplink grant in the PDCCH (physical data control channel).

The processor (e.g. the processor 130) of the radio module may obtain an uplink scheduling from the decoded baseband signals. The uplink scheduling describes the uplink radio resources assigned by the peer communications apparatus for transmitting the uplink data. To be more specific, the uplink scheduling may indicate the predetermined time, code, and/or frequency, depending on which RAT is used, assigned by the peer communications apparatus to transmit the uplink data.

According to an embodiment of the invention, the processor (e.g. the processor 130) of the radio module having the uplink data to be transmitted may further determine whether at least one gap-creation criterion is satisfied. When the gap-creation criterion is satisfied, the processor of the radio module may transmit padding instead of the uplink data to the peer communications apparatus at the predetermined time assigned by the peer communications apparatus. According to another embodiment of the invention, in cases where there is more than one radio module equipped in the communications apparatus as shown in FIG. 2, the coordinator 50 may also determine whether at least one gap-creation criterion is satisfied. When the gap-creation criterion is satisfied, the coordinator 50 may direct the radio module having the uplink data to be transmitted at the predetermined time assigned by the peer communications apparatus to transmit padding instead of uplink data to the peer communications apparatus at the predetermined time.

According to an embodiment of the invention, the padding may be any meaningless byte or bits, such as 0, F, null, or others, as defined by the RAT in use. The purpose of transmitting the padding instead of the uplink data is to make the peer communications apparatus believes that the radio module has fewer or even no uplink data to be transmitted. When the peer communications apparatus believes that the radio module have fewer or no uplink data to be transmitted, the uplink radio resource assigned by the peer communications apparatus for the radio module to transmit subsequent uplink data is reduced, or the peer communications apparatus may assign no uplink radio resource for the radio module. In this manner, before transmitting another scheduling request or performing another random access procedure, a transmission gap (also called gap time) is created.

According to an embodiment of the invention, the size of the padding transmitted by the processor at the predetermined time to create a transmission gap is preferably greater than a size of a basic data unit defined by the RAT in use. According to another embodiment of the invention, the size of the padding transmitted by the processor at the predetermined time to create a transmission gap is preferably greater than the size of header required to be added for transmitting the padding and further plus 1 byte. For example, for LTE, the size of the padding transmitted to create a transmission gap is preferably greater than (5+1)=6 bytes.

Figure 3:
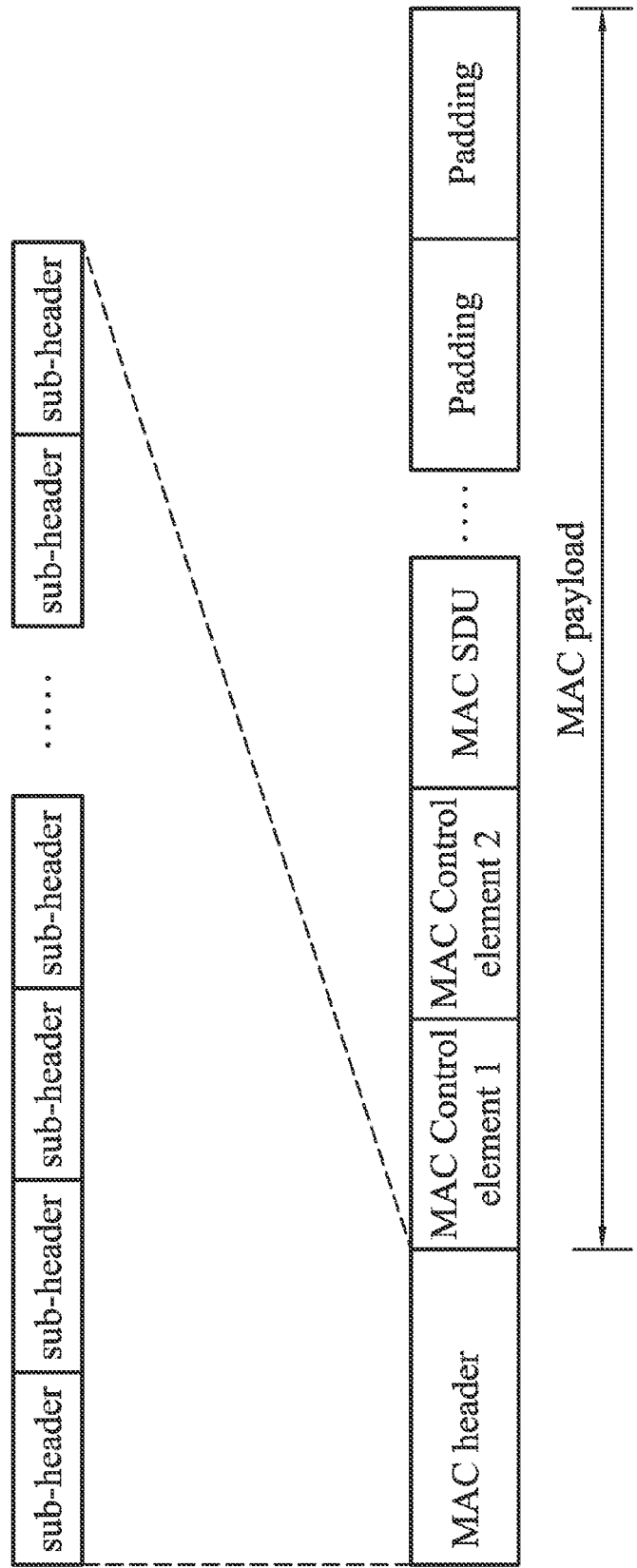
FIG. 3 shows an exemplary MAC PDU with the padding transmitted to create a transmission gap according to an embodiment of the invention.

FIG. 3 shows an exemplary Medium Access Control (MAC) Packet Data Unit (PDU) with the padding transmitted to create a transmission gap according to an embodiment of the invention. The MAC PDU consists of a MAC header, zero or more MAC Service Data Units (MAC SDU), zero, or more MAC control elements, and the padding transmitted to create a transmission gap. Both the MAC header and the MAC SDUs are of variable sizes. A MAC PDU header consists of one or more MAC PDU subheaders, and each subheader corresponds to either a MAC SDU, a MAC control element or padding. Padding usually occurs at the end of the MAC PDU, and may have any value and the peer communications apparatus shall ignore it.

Figure 4:
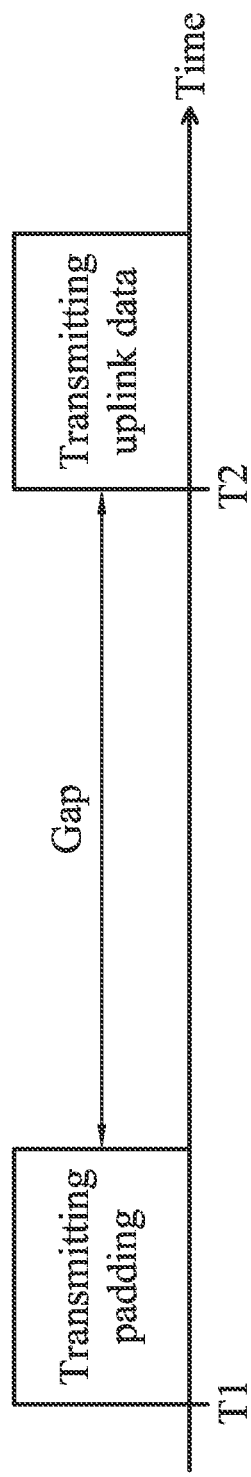
FIG. 4 is an exemplary timing diagram showing the radio activity of the radio module after transmitting the padding according to an embodiment of the invention.

FIG. 4 is an exemplary timing diagram showing the radio activity of the radio module after transmitting the padding according to an embodiment of the invention. According to an embodiment of the invention, in order to create the transmission gap, the processor of the radio module having the uplink data to be transmitted at the predetermined time T1 may buffer the uplink data to be transmitted, and transmit the padding instead of the uplink data at the predetermined time T1. The processor may further transmit another scheduling request or perform another random access procedure and transmit the buffered uplink data at time T2. Therefore, a transmission gap from time T1 to time T2 is created. During the gap time, the processor does not transmit any data via its RF signal processing device.

According to an embodiment of the invention, when the transmission gap is created as a temperature of the communications apparatus 100/200 exceeds an upper threshold, the temperature of the communications apparatus 100/200 can be lowered since there will be no TX radio activity during the gap time. According to another embodiment of the invention, when the transmission gap is created as remaining battery charge of the communications apparatus 100/200 is lower than a lower threshold, the power consumption can be reduced since there will be no TX radio activity during the gap time. As discussed above, the battery device 150/250 and thermal detector 160/260 may provide information regarding the remaining battery charge and the current thermal condition to the processor 130 or coordinator 50. Therefore, the processor 130 and/or coordinator 50 may determine whether a temperature of the communications apparatus exceeds an upper threshold, and/or whether a remaining battery charge of the communications apparatus is lower than a lower threshold.

According to yet another embodiment of the invention, when the transmission gap is created as another radio module has a radio activity to be performed (in cases where there is more than one radio module equipped in the communications apparatus), the another radio module can use the transmission gap to perform its radio activity, so as to avoid the above-mentioned coexistence interference.

Note that, in some embodiments of the invention, the transmission gap may also be created by other methods. According to another embodiment of the invention, when the gap-creation criterion is satisfied, the processor of the radio module having the uplink data to be transmitted may also suspend all radio bearers, or the coordinator 50 may direct the radio module having the uplink data to be transmitted to suspend all radio bearers. When all the radio bearers are suspended, the radio module is able to report the BSR to notify the peer communications apparatus in the network side that the radio module has no available data. When the peer communications apparatus receives such BSR, the peer communications apparatus will stop assigning any uplink radio resource for the radio module to transmit the uplink data. Therefore, a transmission gap after suspension of all radio bearers is created.

According to yet another embodiment of the invention, when the gap-creation criterion is satisfied, the processor of the radio module having the uplink data to be transmitted may reduce a value of power headroom (PHR) and transmit the reduced PHR value to the peer communications apparatus in the network side, or the coordinator 50 may direct the radio module having the uplink data to be transmitted to transmit a reduced PHR value to the peer communications apparatus in the network side. When the peer communications apparatus in the network side received the PHR with a reduced value, the uplink radio resource assigned by the peer communications apparatus for the radio module to transmit subsequent uplink data will be reduced, or the peer communications apparatus may assign no uplink radio resource for the radio module. In this manner, a transmission gap is created.

Figure 5:
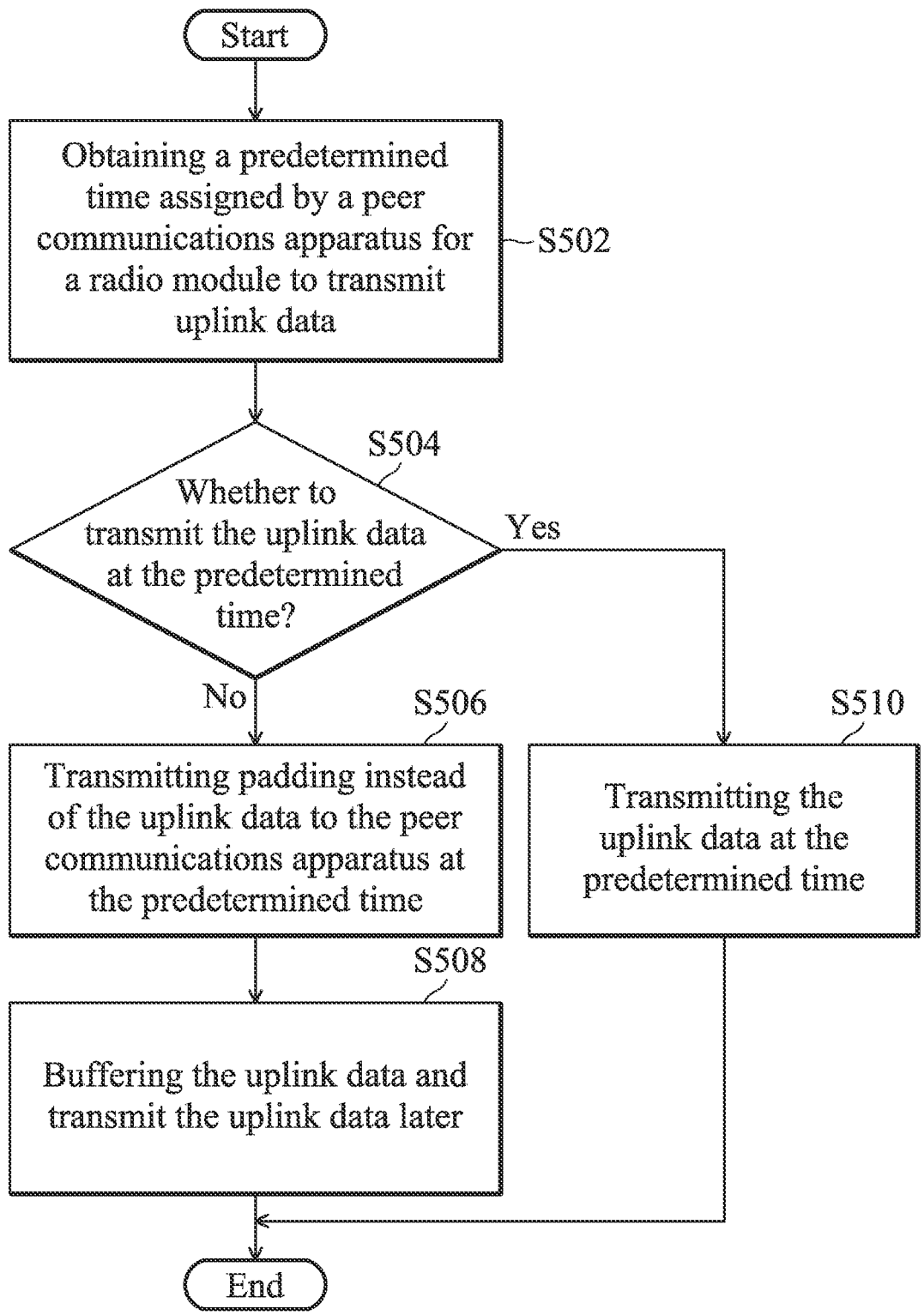
FIG. 5 shows a flow chart of a method for transmission gap creation without causing uplink performance degradation according to an embodiment of the invention.

FIG. 5 shows a flow chart of a method for transmission gap creation without causing uplink performance degradation according to an embodiment of the invention. After a predetermined time assigned by a peer communications apparatus for a radio module to transmit uplink data is obtained (Step S502), the processor or coordinator may determine whether to transmit the uplink data at the predetermined time according to a gap-creation criterion as discussed above (Step S504). When the gap-creation criterion is not satisfied, the radio module may transmit the uplink data at the predetermined time (Step S510).

When the gap-creation criterion is satisfied, the radio module having the uplink data to be transmitted at the predetermined time may transmit padding instead of the uplink data to the peer communications apparatus at the predetermined time (Step S506). Note that in some embodiments of the invention, in step S506, the radio module having the uplink data to be transmitted at the predetermined time may also suspend all radio bearers, or transmit a reduced PHR value to the peer communications apparatus as discussed above, and the invention should not be limited thereto. After performing the step S506, a transmission gap is created. Next, the radio module may buffer the uplink data and transmit the uplink data later after the transmission gap is ended (Step S508).

Note that although the LTE RAT is mentioned in the embodiments discussed above to describe the concept of the invention, the invention should not be limited thereto. The proposed methods for transmission gap creation without causing uplink performance degradation and communications apparatus may be generally applied in any RAT in which the uplink radio resources are controlled and managed by the peer communications apparatus in the network side. For example, the proposed methods for transmission gap creation without causing uplink performance degradation and communications apparatus may be generally applied in 3G, LTE, Wimax, etc.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a first radio frequency (RF) signal processing device, transceiving a plurality of RF signals to and from a peer communications apparatus to communicate with the peer communications apparatus in compliance with a first Radio Access Technology (RAT) and processing the RF signals;
   a first baseband signal processing device, processing a plurality of baseband signals corresponding to the RF signals; and
   a processor, obtaining an uplink scheduling indicating a predetermined time assigned by the peer communications apparatus to transmit uplink data from the baseband signals, determining whether to transmit the uplink data at the predetermined time according to a gap-creation criterion, transmitting padding instead of the uplink data to the peer communications apparatus at the predetermined time when the gap-creation criterion is satisfied, and creating a gap time after transmitting the padding.

2. The communications apparatus as claimed in claim 1, wherein when the processor transmits the padding instead of the uplink data to the peer communications apparatus, uplink radio resources assigned by the peer communications apparatus for the communications apparatus to transmit subsequent uplink data are reduced.

3. The communications apparatus as claimed in claim 1, wherein a size of the padding transmitted by the processor at the predetermined time is greater than a size of a basic data unit defined by the first RAT.

4. The communications apparatus as claimed in claim 1, wherein the gap-creation criterion is whether temperature of the communications apparatus exceeds an upper threshold.

5. The communications apparatus as claimed in claim 1, wherein the gap-creation criterion is whether a remaining battery charge of the communications apparatus is lower than a lower threshold.

6. The communications apparatus as claimed in claim 1, wherein the first RF signal processing device and the first baseband signal processing device are comprised in a first radio module for providing wireless communications services in compliance with the first RAT, and the communications apparatus further comprises:
a second radio module, for providing wireless communications services in compliance with a second RAT,
wherein the gap-creation criterion is whether the second radio module has a radio activity to be performed.

7. The communications apparatus as claimed in claim 1, wherein during the gap time, the processor does not transmit any data via the first RF signal processing device.

8. The communications apparatus as claimed in claim 7, wherein the processor further buffers the uplink data and transmits the uplink data via the first RF signal processing device to the peer communications apparatus after the gap time.

9. A communications apparatus, comprising:
a first radio module, for communicating with a first peer communications apparatus to provide wireless communications services in compliance with a first Radio Access Technology (RAT);
a second radio module, for communicating with a second peer communications apparatus to provide wireless communications services in compliance with a second RAT; and
a coordinator, coupled to the first radio module and the second radio module, directing the first radio module to transmit padding instead of uplink data to the first peer communications apparatus at a predetermined time when the second radio module has a radio activity to be performed, and creating a gap time after the padding,
wherein the predetermined time is assigned by the first peer communications apparatus for the first radio module to transmit the uplink data.

10. The communications apparatus as claimed in claim 9, wherein when the first radio module transmits the padding instead of the uplink data to the first peer communications apparatus, uplink radio resources assigned by the first peer communications apparatus for the first radio module to transmit subsequent uplink data is reduced.

11. The communications apparatus as claimed in claim 10, wherein the second radio module performs the radio activity during the gap time.

12. The communications apparatus as claimed in claim 10, wherein the first radio module further buffers the uplink data and transmits the uplink data to the first peer communications apparatus after the gap time.

13. The communications apparatus as claimed in claim 9, wherein a size of the padding transmitted by the first radio module at the predetermined time is greater than a size of a basic data unit defined by the first RAT.

14. The communications apparatus as claimed in claim 9, wherein the coordinator further directs the first radio module to transmit the padding instead of the uplink data to the first peer communications apparatus at the predetermined time when a temperature of the communications apparatus exceeds an upper threshold.

15. The communications apparatus as claimed in claim 9, wherein the coordinator further directs the first radio module to transmit the padding instead of the uplink data to the first peer communications apparatus at the predetermined time when a remaining battery charge of the communications apparatus is lower than a lower threshold.

* * * * *